United States Patent [19]

Berge et al.

[11] Patent Number: 4,565,709

[45] Date of Patent: Jan. 21, 1986

[54] PROCESS FOR THE PRODUCTION OF FODDER AND FAT FROM ANIMAL RAW MATERIALS

[75] Inventors: Odd Berge, Os; Helge Hovland, Hop, both of Norway

[73] Assignee: Stord Bartz A/S

[21] Appl. No.: 577,010

[22] Filed: Feb. 6, 1984

Related U.S. Application Data

[63] Continuation of Ser. No. 342,886, Jan. 26, 1982, abandoned.

[30] Foreign Application Priority Data

Oct. 16, 1981 [NO] Norway ............................... 813485

[51] Int. Cl.⁴ ............................................... A23K 1/10
[52] U.S. Cl. ................................... 426/641; 426/480; 426/646; 426/807
[58] Field of Search ............... 426/641, 480, 646, 807; 99/538

[56] References Cited

U.S. PATENT DOCUMENTS

| | | | |
|---|---|---|---|
| 3,020,160 | 2/1962 | Downing et al. | 426/480 X |
| 3,078,165 | 2/1963 | Alberts | 426/480 |
| 3,192,047 | 6/1965 | Moyle et al. | 426/646 |
| 3,780,191 | 12/1973 | Langer et al. | 426/480 X |
| 4,122,208 | 10/1978 | Tronstad | 426/641 |
| 4,137,335 | 1/1979 | Holm et al. | 426/480 |
| 4,163,804 | 8/1979 | Meyer et al. | 426/641 X |
| 4,216,239 | 8/1980 | Gloppestad | 426/480 X |
| 4,219,586 | 8/1980 | Parks | 426/641 X |
| 4,232,425 | 11/1980 | Wojcik | 426/480 X |
| 4,361,590 | 11/1982 | Wojcik | 426/480 |

FOREIGN PATENT DOCUMENTS

| | | | |
|---|---|---|---|
| 1200672 | 7/1970 | United Kingdom | 426/480 |
| 1412233 | 10/1975 | United Kingdom | 426/480 |
| 1564277 | 4/1980 | United Kingdom | 426/480 |

*Primary Examiner*—R. B. Penland
*Attorney, Agent, or Firm*—Kenyon & Kenyon

[57] ABSTRACT

Process for the production of fodder and fat from animal raw materials, such as slaughterhouse waste. The raw material is subjected to heating to a temperature of from about 60° to about 135° and is separated thereafter into a solid material phase and a fluid phase. The solid material phase is subjected to a separate drying step and thereafter steps for the separation of fat and solid material individually. The fluid phase is subjected to separate evaporation the evaporation product being wholly or partially supplied to the solid material phase for separation of fat and solid material individually. Heat energy in the gases emitted from the drying step of the solid material phase is used in an evaporation step for the fluid phase.

27 Claims, 4 Drawing Figures

PROCESS FOR THE PRODUCTION OF FODDER AND FAT FROM ANIMAL RAW MATERIALS

This is a continuation of application Ser. No. 342,886, filed Jan. 26, 1982, now abandoned.

This invention relates to a process for the production of fodder and fat from animal raw materials, such as slaughterhouse waste.

The raw material which can be employed in the production of fodder and fat can consist of slaughterhouse waste, so-called offal and other available animal products. The raw materials can contain from 40 to 70 percent water and from 35 to 10 percent fat, while the remainder consists mainly of various protein-containing solid materials.

The objective is to produce a meat and bone meal with a water content of 5-10% and a fat content of 8-15% and with the remainder consisting of dry material.

At the same time, the aim is to produce fat (suet) which practically speaking is free of water and dry material.

From United Kingdom Pat. No. 412,233, Swedish Pat. No. 317,862 and United Kingdom Pat. No. 1,200,672 the heating and dividing up of the raw material into separate functions which are treated individually, is known. Other similar processes are known from U.S. Pat. No. 4,259,252 and United Kingom Patent Specification No. 1,564,277.

In known plants for the production of fodder of the meat and bone meal type together with fat (suet), it is usual, however, to first effect a rough division (rough cutting) of the raw material before it is subjected to drying in a steam-heated drier. The product which is delivered from the drier can contain from 30 to 60% fat and about 5% water. The fat is, thereafter, squeezed out in continuously operating high pressure presses of the screw type. The end products consist of a protein-rich fodder together with fat.

In most European countries, there exists a need for sterilisation of the raw material. Usually the sterilisation is effected at a temperature of about 133° C. at a pressure of about 3 bars in approximately 15 minutes in autoclaves. The drying itself is normally carried out immediately after the pressure treatment (the sterilisation). Pressing of the product into a solid material phase (fodder) and a fluid phase (fat) is effected thereafter. By the pressure—heat treatment the materials are broken down thermally. However, this makes the pressing in the subsequent press step difficult since in order to separate the fat from the solid material phase, one is dependent upon a fibrous structure of the solid material. Consequently, problems can arise in getting sufficiently large quantities of fat material separated from the solid material which is to form the fodder substance.

On operative economic grounds, it is advantageous to utilise heat energy from certain process steps of the remaining process steps. Hitherto, in order to be able to utilise such waste heat, it has been necessary to finely divide the raw material to a particle size having a diameter dimension of 5-10 millimeters (mm). In the operative economic sum, however, one must also take into account that investment must be made in fine grinding mills which in themselves are energy demanding and which, in addition, are exposed to a large amount of wear. In addition, one must pay attention to the fact that the separation of fat in the pressing step is significantly reduced by such a fine grinding of the product since, in a manner corresponding to the afore-mentioned pressure treatment (sterilisation), a breakdown of the desired highly fibrous structure of the solid material is obtained. By combining, in addition, the pressure treatment (the sterilisation) with the fine grinding, a further reduction of the pressability of the product is obtained. This results in a fodder with a high content of fat material and a fat with a high content of dry material. Both portions are undesired.

Also there exists on the market, a plant which removes the fat material from the product by effecting extraction with a suitable solvent.

With the present invention the aim is a process which, viewed generally, is advantageously operatively economic, at the same time as there is obtained a fodder having a relatively low content of fat material and a fat having a low content of dry material. A special objective is to achieve these advantages in a process where fine grinding of the raw material is avoided thereby saving significant investment and maintenance expenses in fine mills and, simultaneously, saving significant energy which would otherwise be involved in fine grinding. In addition, by avoiding the fine grinding there is obtained a dried material which is better suited for pressing than a finely divided product.

Accordingly, the present invention resides in a process for the production of fodder and fat from animal raw material, such as slaughterhouse waste, which comprises the steps of:

(a) heating the raw material to a temperature of from about 60° to about 135° C. and separating the heated product into a solid material phase and a fluid phase, (b) separately drying the solid material phase and thereafter separating the dried product into solid fodder and fat, (c) separately evaporating the fluid phase, and (d) extracting fat by a procedure selected from
  (i) feeding the evaporated product of step (c) at least in part to the solid material phase of step (a) prior to carrying out step (b), and
  (ii) directly working up the evaporated product of step (c) into fat.

The improvement consists in utilising heat energy derived from gases emitted on drying the solid material phase when separately evaporating the fluid phase in step (c).

In an earlier stage of the process—that is to say immediately after the heating step and the prospective sterilisation included therein—by separating the raw material into a solid material phase and a fluid phase, there is the possibility of using the heat energy (waste heat) from the drying step of the solid material phase for an evaporation step of the fluid phase, that is to say independently of the otherwise necessary fine grinding of the raw material. In most instances, however, a rough cutting of the raw material is preferred for production reasons, something, however, which to an immaterial degree affects the fiber structure and the pressability of the product.

By separating the raw material into a solid material phase and a fluid phase at an earlier stage of the process, the advantage is obtained that the bulk of the water content can be driven off in a relatively simple manner from a portion of the raw material, that is to say from the fluid phase itself, while remaining portions of the raw material, that is to say the solid material phase, can be treated separately. This means that the solid material phase requires less heat energy in the drying step than the whole quantity of raw material had to have in the drying step. In addition, it is made possible for the heat energy (waste heat) in the emitted gases from the drying step of the solid material phase to be utilised in an economically advantageous manner for the evaporation step of the fluid phase.

The evaporation of the fluid phase can, if necessary, be effected by multi-step evaporation. In this connection, it is preferred that the evaporation of the fluid phase comprises a first evaporation step with heat energy supplied from the emitted gases from the drying step of the solid material phase, while a second evaporation step has a separate supply of heat energy (live steam), and the emitted gas heat from the second evaporation step is fed together with emitted gas heat from the drying step to the first evaporation step. Alternatively, a sufficiently high temperature can be ensured in the first evaporation step so that the waste heat from the first step can be used as the only source of heat in the second evaporation step.

After the fluid phase has passed the second evaporation step, it can be worked up further in a second treatment step, for example, in a further evaporation step or in a subsequent sediment separation from which the sediment can be fed to the high pressure press of the solid material phase together with the solid material from the drier of the solid material phase.

If there exists a demand for sterilisation (pressure treatment), this can be effected in the heating step. Alternatively, it can be effected after the phase separation. This improves a sterilisation of the solid material phase and the fluid phase individually or a sterilisation of the mixture of the solid material phase and the fluid phase after there is effected separate evaporation of these phases.

In order that the invention can be more clearly understood, convenient embodiments thereof will now be described, by way of example, with reference to the accompanying drawings in which.

Figure 1:
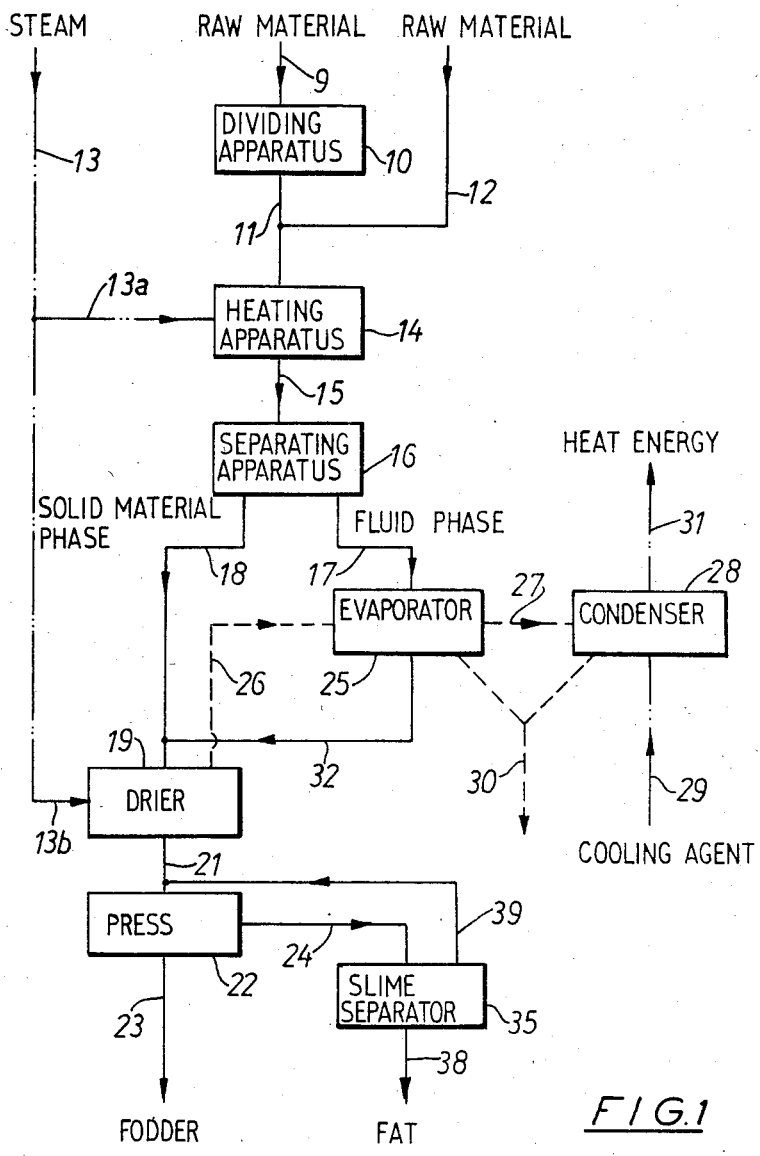
FIG. 1 is a first process diagram where the fluid phase after separate evaporation is led together with the solid material phase to the inlet of the drier of the solid material phase.

Referring to FIG. 1, a feed conduit 9 supplies raw material in the form of slaughterhouse waste, offal and other available animal products to a dividing apparatus in the form of a coarse grinding mill 10. The raw material is fed at a temperature of, for example, 20° C. and can, for example, have a content of 47% water, 22% fat material and of 31% solid materials (dry material). It is desirable to produce a fodder (meat and bone meal) with a content of 5-10% water, a content of 8-15% fat material and a content of 75-85% dry material, together with a fat. For certain animal products, the coarse grinding mill is an advantage while for other animal products it is not a stipulation. Consequently, there are illustrated one feed path 9, 11 through the mill 10 and a second feed path 12 outside the mill. Both paths lead to a heating apparatus 14 which, by feeding steam via a steam conduit 13 and associated branch conduit 13a, can be heated directly or indirectly with steam, hot water or another heat-bearing medium or by a combination of such modes of heating. The heating can, for example, be effected in an apparatus provided with a thermally heated screw or in a vessel with an agitator in which either the vessel or the agitator or both components are indirectly heated with steam. The heating can be effected under atmospheric pressure as well as under vacuum. The purpose of the heating of the raw material is to obtain a condition where a portion of the fluid substances (fat, water, dissolved dry material and the like) can be readily separated from the solid materials (meat, bone and the like). In this connection, the raw material can be heated to a temperature of 60°–135°, preferably 90°–100° C.

After the raw material has undergone the afore-mentioned heating, it is fed, via the conduit 15, to a separating apparatus 16 for separating a fluid phase in a first discharge conduit 17 and a solid material phase in a second discharge conduit 18.

The separation can, for example, be effected in a press where the heated product is subjected to a volume reduction and where the fluid phase can be pressed through openings in the press (press basket) while the solid material phase is screwed forwards internally in the press to a separate solid material outlet at one end of the press. The press can be provided, in a known manner, with a screw having a rising number of threads or with a gradually decreasing screw diameter or with a gradually increasing screw stem diameter or with a combination of such screw designs. It is possible to allow the squeezing of the fluid phase to occur outwards from the screw housing (via the press basket) as well as inwards via a hollow screw stem. It is also possible to employ two cooperating screws or a single screw, as required. Alternatively, one can instead screw with a screw housing employing a piston with associated cylinder having a number of associated openings for the fluid phase and an opening for emptying the solid material phase respectively.

It is also possible to allow the separation of the fluid phase from the solid material phase to be effected by gravitation, the lower density of the fluid phase being utilised to separate the phases from each other.

The purpose of separating the raw material into a fluid phase and a solid material phase is to be able to treat these portions of the raw material individually in a rational manner, as will be stated below. In this connection, the particular objective is to be able to use the heat energy from the treatment of the one solid (solid material phase) for the treatment of the other phase (the fluid phase).

The solid material phase (press cake) which is delivered to the conduit 18 based on various raw materials has a more or less constant content of water, fat material and dry material, that is to say according to the analyses in the present case 49% water, 7% fat material and 44% dry material.

From the conduit 18, the solid material phase is led to a drier (rotadisc drier) 19 in which a predominant proportion of the water content is removed, live steam being supplied from the conduit 13 via the branch conduit 13b.

From the drier 19, the product is led, via a conduit 21, to a high pressure press 22. In a first discharge conduit 23, a fodder (meat and bone meal) is delivered and in a second discharge conduit 24 fat (suet) is delivered.

The fluid phase is led from the conduit 17 to an evaporation apparatus 25 where a large proportion of the water content is removed. The evaporation apparatus 25 is supplied heat energy for evaporation of the fluid phase via a discharge conduit 26 for the gases emitted from the drier 19 of the solid material phase. As a consequence of the relatively high temperature which is employed for heating the solid material phase in the drier 19, abundant heat energy remains for use in the evaporation apparatus 25 of the fluid phase. At the inlet to the evaporation apparatus, the fluid phase can have a content of 45% water, 36% fat material and 19% dry material while at the outlet of the evaporation apparatus, it can have a content of 20% water, 52% fat material and 28% dry material. Analyses of the fluid phase will vary greatly according to which raw materials and which raw material compositions are used respectively.

From the evaporation apparatus, there is shown a conduit connection 27 to a condenser 28 which is supplied with a cooling agent in a conduit 29 while the condensate is removed via the outlet 30 and the heated cooling agent is led, via a conduit 31 to an arbitrary heating apparatus for further utilisation or residual heat energy (for example, the apparatus 14).

From the evaporation apparatus 25, the product (evaporated fluid phase) is led, via a conduit 32, into the conduit 18 and is guided together with the solid substance phase to the drier 19 and via the conduit 21 to the press 22. In the press 22, the fat material is squeezed from the dried mixture (of the solid material phase and the fluid phase) which is delivered from the drier 19.

In the press 22, there is produced a fodder (meat and bone meal) with a content of 7.5% water, 10% fat material and 82.5% dry material, which is delivered via the discharge conduit 23 and a fat (suet) which is delivered via the discharge conduit 24. The fat from the conduit 24 is cleaned in a slime or sediment separator 35 and is delivered via a discharge conduit 38 while slime is guided back to the press via conduits 39 and 21.

The slime generator 35 can, for example, effect the separation of the solid materials (the dry materials) from the fat by filtration, centrifuging or another utilisation of density variations in the fat material and the dry material or the solid materials. Depending upon which slime separators are employed, the dry material content in the end product fat (suet) can be regulated.

Figure 2:
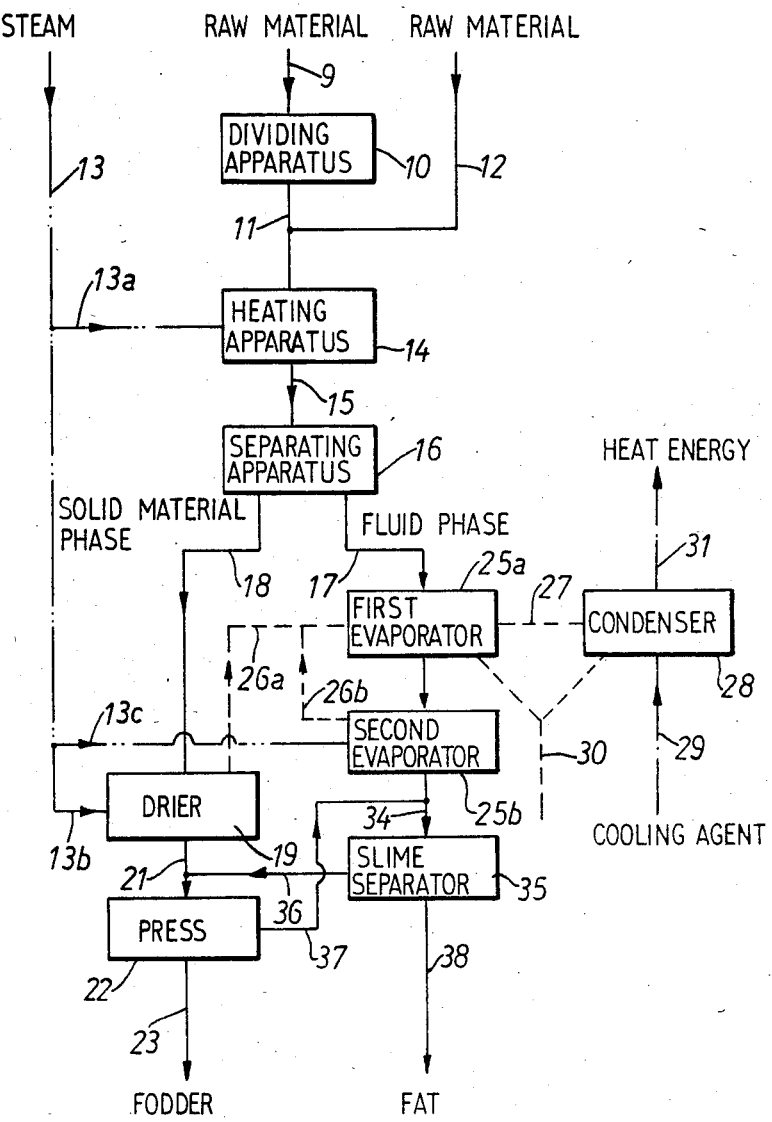
FIG. 2 is a second process diagram where the fat phase and the solid material phase are worked up to the end product individually.

Referring to FIG. 2 there is shown another process in which the solid material phase and the fluid phase are finally treated individually to a fodder and to a fat material (suet) respectively. The process according to FIG. 2 is similar, however, to that of Example 1 in several respects.

In the process of FIG. 2, there is produced in the separation apparatus (the press) 16 a solid material phase (press cake) with a content of water, fat material and dry material corresponding to the press cake of FIG. 1 and corresponding fluid phase (press fluid) with a corresponding content of water, fat material and dry material to that of the press fluid of FIG. 1.

A significant difference between the two processes of FIGS. 1 and 2 consists in the employment of a first evaporation apparatus 25a and a second evaporation apparatus 25b in FIG. 2 instead of the evaporation apparatus 25 in FIG. 1. The second evaporation apparatus 25b is supplied with heat energy separately via a branch conduit 13c from live steam feed conduit 13 while the first evaporation apparatus 25a is supplied with heat energy from the emitted gases which are delivered, via the conduit 26a, from the drier 19 and via a conduit 26b from the second evaporation apparatus 25b. In front of the first evaporation apparatus 25a, the fluid phase has a content of 45% water, 36% fat material and 19% dry material while that in the conduit between first and second evaporation apparatuses, has a content of 20% water, 52% fat and 28% dry material. In a conduit 34 after the second evaporation apparatus 25b, the fluid phase has an especially low content of water and a content of about 61% fat material and about 31% dry material. From the conduit 34, the fluid phase passes into a slime separator 35 and the solid materials which are separated in the slime separator are led, via a discharge conduit 36, to the conduit 21 and are led from there combined with the solid material phase from the drier 19 to the press 22. The fodder which is delivered from the press 22 has a content of 7.5% water, 10% fat material and 82.5% dry material. The fat material which is squeezed from the solid material phase in the press 22, is led in a conduit 37 to a conduit 34 in front of the slime separator 35. In a manner corresponding to that of FIG. 1 a fat (suet) is delivered in the discharge conduit 38.

In the present case, there is described the use of a raw material having a content of 47% water and 22% fat material. Other raw material can have a content of from 40 to 70% water and from 35 to 10% fat material.

In another case where there was employed a process corresponding to that described in FIG. 1 and where the raw material had a content of 60% water, 18% fat material and 22% dry material, there was obtained at the outlet of the separating apparatus 16 a press cake with a content of 48% water, 7% fat material and 45% dry material and a press fluid with 66% water, 24% fat material and 10% dry material. At the outlet of the drier, a product was obtained having a content of 5% water, 43% fat material and 52% dry material and at the outlet of the press, a fodder with a content of water, fat material and dry material corresponding to that of FIG. 1, that is to say 7.5% water, 10% fat material and 82.5% dry material and separately a fat (suet) with low water content.

There was employed a process corresponding to that of FIG. 2 and there was used a raw material having a content of 60% water, 18% fat material and 22% dry material.

At the outlet of the drier, a product was obtained with a content of 5% water, 12% fat material and 83% dry material. The fodder which was delivered from the press according to FIG. 2 had a content of 7.5% water, 10% fat material and 8.25% dry material.

The product from the first evaporation apparatus 25a had a content of 43% water, 41% fat material and 16% dry material while the product from the second evaporation apparatus 25b had an especially low content of water, about 70% fat material and about 30% dry material.

Figure 3:
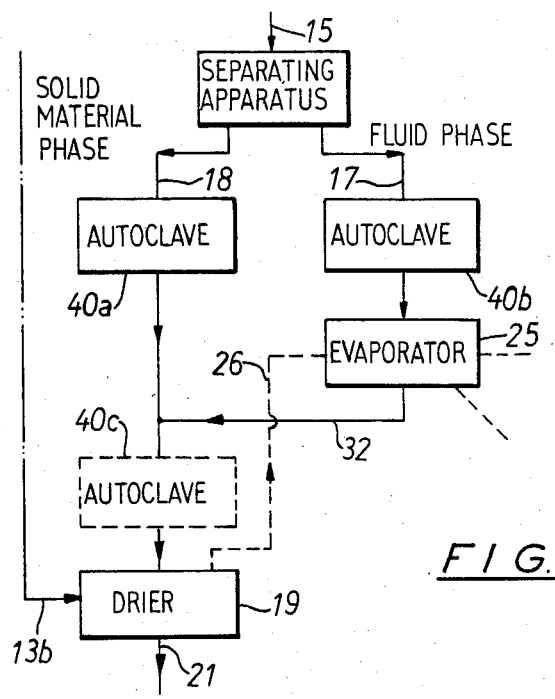
FIG. 3 is a part process diagram illustrating a modification of the process of FIG. 1.

In FIG. 3, there is shown a first autoclave 40a for the solid material phase inserted in the conduit 18 just after the separating apparatus 16 and a second autoclave 40b for the fluid phase inserted in the conduit 17 between the separating apparatus 16 and the evaporator 25. In this instance, the hot, autoclave-treated products will be able to utilise directly the heat content in the drier 19 and the evaporator 25 respectively so that the extra heat supply can be correspondingly reduced to the drier and to the evaporator respectively.

In practice, there can occur a need for separating the plant's "unclean" side from its "clean" side. By broken lines, there is shown an autoclave 40C which is disposed just in front of the drier 19, that is to say just after the coupling together between the conduit 18 from the separating apparatus 16 and the conduit 32 from the evaporator 25. The autoclave 40c can replace the autoclaves 40a and 40b and simultaneously all the apparatuses in front of the autoclave 40c can be arranged on the "unclean" side of the plant.

Figure 4:
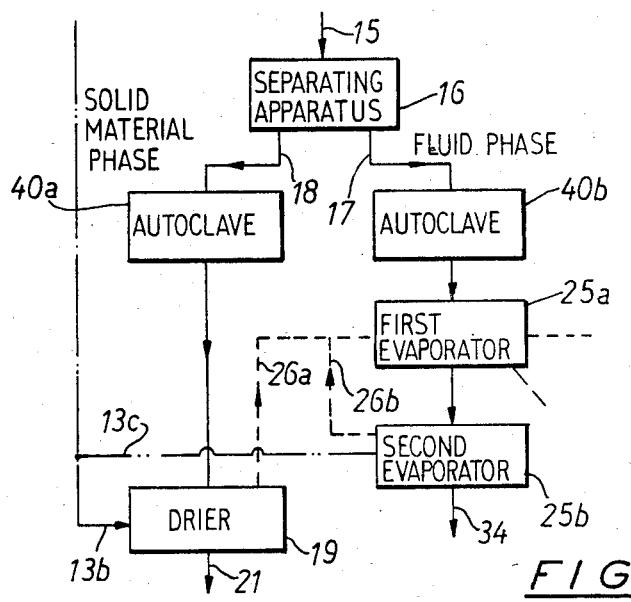
FIG. 4 is a part process diagram illustrating a modification of the process of FIG. 2.

In FIG. 4, there is shown correspondingly a first autoclave 40a in the conduit 18 between the separating apparatus 16 and the drier 19 and a second autoclave 40b in the conduit 17 between the separating apparatus 16 and the first evaporator 25a.

We claim:

1. In a process for the production of fodder and fat from animal raw material, such as slaughterhouse waste, which comprises the steps of:
    (a) heating said raw material to a temperature of from about 60° to about 135° C. and separating the heated product into a solid material phase and a fluid phase,
    (b) separately drying said solid material phase and thereafter separating the dried product into solid fodder and fat,
    (c) separately evaporating said fluid phase, and
    (d) extracting fat by a procedure selected from
        (i) feeding the evaporated product of step (c) at least in part to said solid material phase of step (a) prior to carrying out step (b), and
        (ii) directly working up the evaporated product of step (c) into fat,
the improvement which consists in utilising heat energy derived from gases emitted on drying said solid material phase when separately evaporating said fluid phase in step (c).

2. The process of claim 1, wherein said fluid phase is evaporated by employing first heat energy derived from said gases emitted on drying said solid material phase in a first evaporation step and second heat energy supplied separately in a second evaporation step, third heat energy derived from gases emitted in said second evaporation step being combined with said first heat energy in performing said first evaporation step.

3. A process for the production of meat and bone meal and fat from slaughterhouse waste consisting essentially of:
    (a) heating said waste to a temperature of from about 50° to about 135° C. and separating the heated product by pressing into a solid material phase and a fluid phase,
    (b) separately drying said solid material phase and thereafter separating the dried product by pressing into solid meat and bone meal and fat,
    (c) separately evaporating said fluid phase, and
    (d) extracting fat from said evaporated fluid phase by one of
        (i) feeding the evaporated product of step (c) at least in part to said solid material phase of step (a) prior to carrying out step (b), and
        (ii) directly working up the evaporated product of step (c) into fat,
whereby heat energy derived from gases emitted on drying said solid material phase is utilized when separately evaporating said fluid phase in step (c).

4. The process of claim 3, wherein said fluid phase is evaporated in a first evaporation step by employing heat energy derived from said gases emitted on drying said solid material phase and heat energy derived from gases emitted in a second subsequent evaporation step.

5. A process for processing slaughterhouse waste material into meat and bone meal and fat consisting essentially of the steps of
    heating the waste material to a temperature of from 60° C. to 135° C.;
    pressing the heated material to separate the material into a solid material phase and a fluid phase;
    drying the solid material phase with live steam to remove water and obtain a dried product while exhausting hot waste gas;
    evaporating the fluid phase with said waste gas at least in part; and
    pressing the dried product to separate the product into a first solid meat and bone meal fraction and a second fat fraction.

6. In a process as set forth in claim 5 which further consists essentially of the step of adding the evaporated fluid phase to the solid material phase prior to drying of the solid material phase.

7. In a process as set forth in claim 5 which further consists essentially of the steps of separating the evaporated fluid phase into fat and solid materials and combining said solid materials with the dried product prior to separation of the dried product into solid meal and fat.

8. In a process as set forth in claim 7 which further consists essentially of the steps of evaporating water from the fluid phase in two sequential stages to obtain an evaporated fluid phase and separating fat from the resultant evaporated fluid phase.

9. In a process as set forth in claim 5 wherein the solid meal has a content of 7.5% water, 10% fat material and 82.5% dry material.

10. A process of processing a slaughterhouse waste material consisting essentially of
    heating a slaugherhouse waste material containing water, fat material and dry material;
    pressing said heated waste material to separate said material into a high-fat fluid phase containing water, fat material and dry material and a low-fat solid material phase containing water, fat material and dry material;
    heating the solid material phase to remove water therefrom while exhausting hot waste gas therefrom to obtain a dried product;
    separately pressing the dried product at a high pressure to separate the product into a first meat and bone meal fraction and a first fat fraction; and
    heating the fluid phase with the hot waste gas to evaporate water therefrom to obtain an evaporated fluid phase containing fat material, dry material and a reduced amount of water.

11. A process as set forth in claim 10 which further consists essentially of the step of combining the evaporated fluid phase with the solid material phase prior to heating of the solid material phase.

12. A process as set forth in claim 10 which further consists essentially of the steps of separating the evaporated fluid phase into dry material and fat, combining the separated dry material with the dried product, thereafter separating the combined dry material and dried product into a meat and bone meal fraction and a second fat fraction, and combining the second fat fraction with the evaporated fluid phase prior to separation of the evaporated fluid phase.

13. A process as set forth in claim 10 which further consists essentially of the steps of adding the first fat fraction to the evaporated fluid phase and, thereafter separating the resulting mixture of added fat and evaporated fluid phase into fat and solid materials.

14. A process as set forth in claim 13 further consists essentially of the steps of delivering the solid materials obtained from said mixture to the solid material phase prior to heating of the solid material phase.

15. A process of processing an animal raw material consisting essentially of:
heating a slaughterhouse waste material containing water, fat material and dry material;
pressing the heated waste material to separate the material into a high fat fluid phase containing water, fat material and dry material and a low fat solid material phase containing water, fat material and dry material;
heating the solid material phase to remove water therefrom while exhausting hot waste gas therefrom and to obtain a dried product; and
heating the fluid phase with the hot waste gas to evaporate water therefrom to obtain an evaporated fluid phase containing fat material, dry material and reduced amount of water.

16. A process as set forth in claim 15 which further consists essentially of the steps of separating the evaporated fluid phase into dry material and fat, combining the separated dry material with the dried product and combining said separated fat with the evaporated fluid phase prior to separation thereof.

17. A process as set forth in claim 15 which further consists essentially of the steps of separating the evaporated fluid phase into dry material and fat and combining the separated dry material with the dried product from the solid material phase to obtain a meat and bone meal fraction.

18. A process as set forth in claim 17 wherein said meat and bone meal fraction has a content of 7.5%, 10% fat material and 82.5% dry material.

19. A process as set forth in claim 17 wherein the separated dry material and the dried product are dried to a meat and bone meal fraction.

20. In a process of processing a slaughterhouse waste material, the steps of:
heating a slaughterhouse waste material containing water, fat material and dry material;
pressing said heated waste material to separate said waste material into a high-fat fluid phase containing water, fat material and dry material and a low-fat solid material phase containing water, fat material and dry material;
heating the solid material phase to remove water therefrom while exhausting waste heat energy therefrom; and
heating the fluid phase with the waste heat energy to evaporate water therefrom and to obtain an evaporated fluid phase containing fat material, dry material and a reduced amount of water.

21. A process as set forth in claim 20 which further comprises the steps of combining the evaporated fluid phase with the solid material phase prior to heating of the solid material phase and thereafter separating the combined phases into a meat and bone meal fraction and into a fat fraction.

22. In a process of processing an animal raw material, the steps of
heating an animal raw material containing water, fat material and dry material to a temperature sufficient to obtain a condition where a portion of fluid substances can be separated from solid materials;
pressing the heated material to separate the material into a high fat fluid phase containing water, fat material and dry material and a low fat solid material phase containing water, fat material and dry material;
heating the solid material phase with steam to remove water therefrom and to obtain a dried product while exhausting hot waste gas therefrom; and
heating the fluid phase with the heat energy of the hot waste gas to evaporate water therefrom to obtain an evaporated fluid phase containing fat material, dry material and a reduced amount of water.

23. A process as set forth in claim 22 which further comprises the step of separating the dried product from the solid material phase into a solid meat and bone meal fraction and into a fat fraction.

24. A process as set forth in claim 22 which further comprises the steps of heating the fluid phase in at least two stages, separating fat from the heated fluid phase and delivering solid materials from the heated fluid phase to the solid material phase.

25. In a process of processing a slaughterhouse waste material into fodder and fat, the steps of
heating a raw slaughterhouse waste material to a temperature of from 60° C. to about 135° C.;
separating the heated raw material into a solid material phase of low fat content and a fluid phase of high fat content;
drying the solid material phase to evaporate water therefrom while exhausting waste heat energy; and
heating the fluid phase with the waste heat energy to evaporate water therefrom while obtaining an evaporated fluid phase product of high fat content.

26. A process as set forth in claim 25 which further comprises the steps of combining the evaporated fluid phase product with the solid material phase prior to said drying step and thereafter separating the combined phases into a fodder and a fat.

27. A process as set forth in claim 25 which further comprises the steps of heating the evaporated fluid phase product to evaporate further water therefrom and to obtain a fluid phase of low water content, thereafter separating fat from the fluid phase of low water content, and pressing the dried solid material phase to obtain a fodder therefrom.

* * * * *

UNITED STATES PATENT AND TRADEMARK OFFICE
CERTIFICATE OF CORRECTION

PATENT NO. : 4,565,709
DATED : January 21, 1986
INVENTOR(S) : Odd Berge and Helge Hovland It is certified that error appears in the above-identified patent and that said Letters Patent is hereby corrected as shown below:

Column 1, line 24 change "Pat. No. 412,233" to -Pat. No. 1,412,233-

Column 1, line 27 change "functions" to -fractions-

Column 3, line 33 change "improves" to -involves-

Column 5, line 40 change "generator" to -separator -

Column 6, line 52 Change "8.25%" to -82.5%-

Signed and Sealed this

Twentieth Day of May 1986

[SEAL]

Attest:

DONALD J. QUIGG

Attesting Officer

Commissioner of Patents and Trademarks